June 16, 1942.  R. E. KELLER  2,286,549
AUTOMATIC TRANSMISSION
Original Filed March 14, 1934   2 Sheets-Sheet 1

INVENTOR.
REX E. KELLER
BY
ATTORNEY.

June 16, 1942.  R. E. KELLER  2,286,549
AUTOMATIC TRANSMISSION
Original Filed March 14, 1934  2 Sheets-Sheet 2
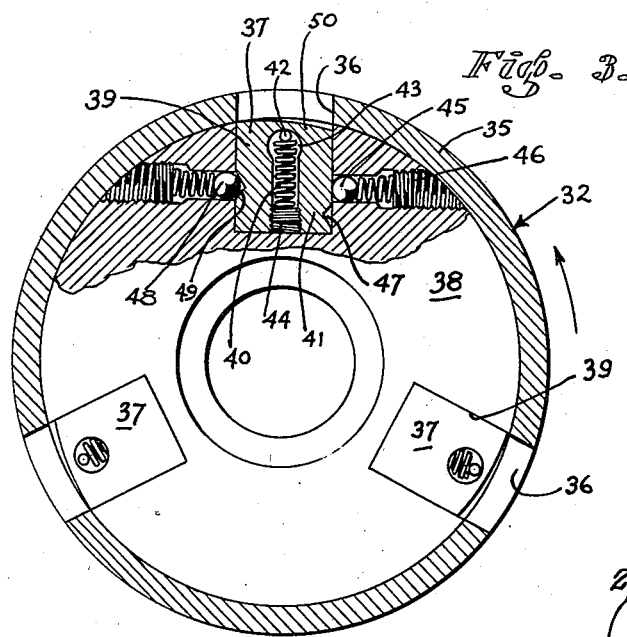
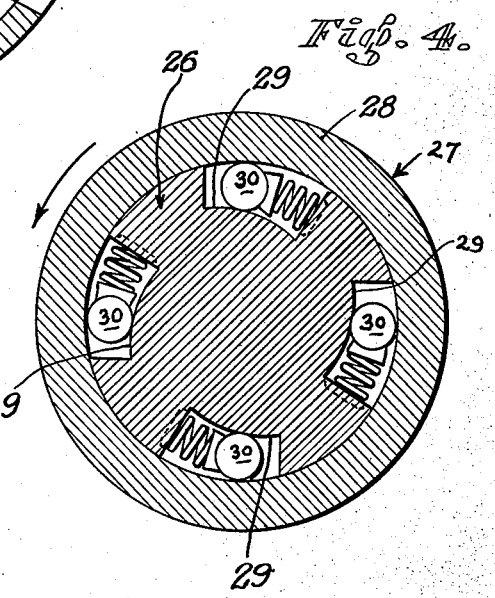
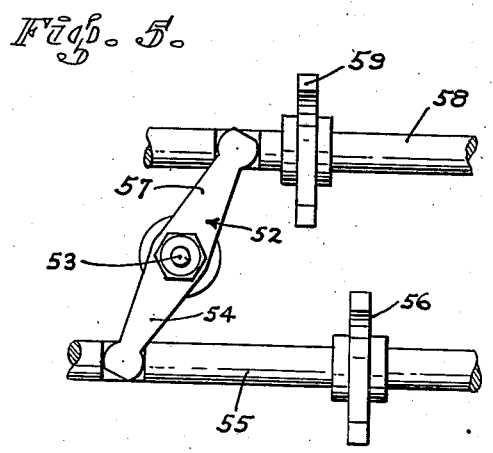
INVENTOR.
REX E. KELLER
ATTORNEY.

Patented June 16, 1942

2,286,549

UNITED STATES PATENT OFFICE 2,286,549

AUTOMATIC TRANSMISSION

Rex E. Keller, Beverly Hills, Calif.

Original application March 14, 1934, Serial No. 715,513. Divided and this application April 22, 1940, Serial No. 330,836

10 Claims. (Cl. 74—336)

This invention relates to transmission mechanism and particularly the application of automatic speed changing mechanisms to various types and arrangements of power transmitting mechanism operable for providing variable speed driving connections between a driving shaft and a driven shaft. The present application is a division of my application, Serial No. 715,513 for Automatic transmission, filed March 14, 1934.

As illustrated in the accompanying drawings, an automatic speed changing mechanism including driving and driven clutch members having a centrifugally operable bolt carried by one of said members and operable upon synchronization of the rotative speeds of said clutch members for positive locking engagement with the other of said clutch members, is provided for effecting changes in the ratio of the driving connection between a driving shaft and a driven shaft, between which shafts an overrunning clutch having an element operatively connected to each of said shafts is provided for effecting an initial one-way driving connection for initiating the rotation of said driven shaft and the clutch members connected thereto.

A principal object of the invention is to provide an overdrive transmission for driving a driven shaft at a rate faster than that of a driving shaft with an automatic speed changing mechanism for effecting a change from a direct to an overdrive with manually operable means whereby selective changes in the character and ratio of the driving connection may be made without regard to the automatic speed changing mechanism.

Another object of my invention is to provide a simple, compact and reliable overdrive transmission of the character described wherein overdrive gearing is embodied in the countershaft of the transmission together with an overrunning clutch and an automatic centrifugal clutch, and this assembly is so associated with driving and driven shafts and a shiftable clutch and an overdrive clutch so as to afford the advantages and purposes hereof in a particularly efficacious manner.

Other objects and advantages will be apparent from a reference to the following specification taken in conjunction with the accompanying drawings, of which there are five sheets and in which:

Fig. 3 is a vertical cross-section taken in a plane on the line 3—3 of Fig. 2 and illustrating the details of a centrifugal clutch forming part of this invention;

Fig. 4 is a vertical cross-section taken in a plane on the line 4—4 of Fig. 2, illustrating the details of an overrunning clutch forming a part of this invention;

Fig. 5 is a detailed view of the mechanism for shifting parts of the overdrive transmission illustrated in Fig. 2.

Figure 1:
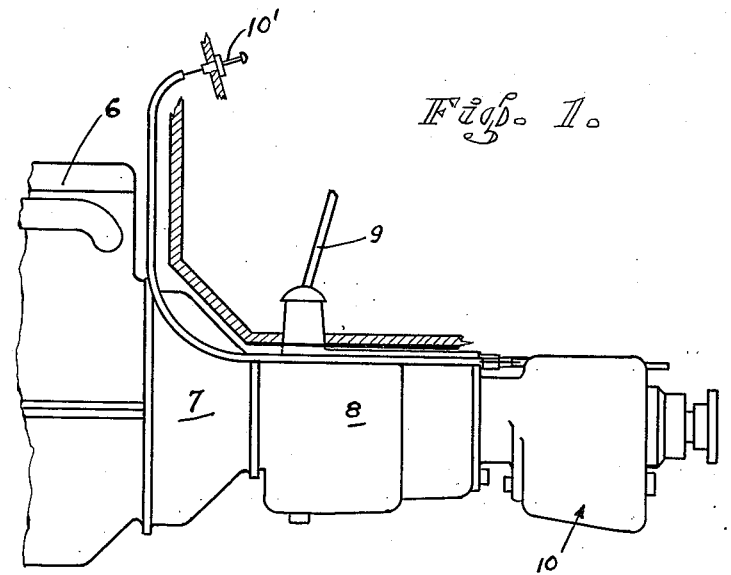
Fig. 1 is a diagrammatic side elevational view of a portion of an automotive vehicle and illustrating the application thereto of an overdrive transmission embracing my invention.

Referring now to Fig. 1 of the drawings, there is shown, more or less diagrammatically, a portion of an automotive vehicle having an engine 6, a housing-enclosed clutch mechanism 7, a change speed gearing 8 provided with a manipulative shift lever 9 for adjusting the same, and an overdrive transmission 10 provided with a dash control 10' for selectively adjusting the same.

In one embodiment of my invention, a driving shaft 11 has a gear 12 fixed thereto and in constant mesh with a gear 13 rotatably mounted in a suitable bearing 14. A gear 15, fixed to a driven shaft 16 for rotation therewith, is in constant mesh with a gear 17 fixed for rotation with a countershaft 18, one end of which is journaled in a suitable bearing 19 and the other end of which is journaled in a bore in the gear 13. An externally splined shaft 20 is journaled in gears 12 and 15 and has splined thereto a slidable sleeve 21 which at one end thereof is provided with an external set of teeth 22 adapted to mesh with an internal set of teeth 23 provided on the gear 12 for the purpose of locking the intermediate shaft 20 to said gear for rotation therewith. The sleeve 21 at the other end thereof is provided with a toothed clutch element 24 which is adapted to be engaged with an internal set of teeth 25 provided on an annular flange 26 which may be formed integral with the gear 15.

An overrunning clutch 27 of the type disclosed in Fig. 4 of the drawings is disposed between intermediate shaft 20 and the annular flange 26 of the gear 15 for providing a one-way driving connection between the shaft 20 and the gear 15 so that the latter may rotate at a rate in excess of that of the shaft 20. As shown in Fig. 4, the flange 26 serves as the driving member of the overrunning clutch 27 and the driven clutch member 28 is formed integral with shaft 20 and provided with eccentric raceways 29 in which spring loaded rollers 30 are mounted. These rollers are arranged to be moved between the opposed surfaces of the raceways and said flange, into and out of wedging and driving contact with said surfaces. When the flange 26 is driven in the direction of the arrow in Fig. 4, the rollers will be moved towards the smaller or shallow ends of the raceways and thereby wedge between the driving and driven members whereby to drive the shaft 20. At this time the driven member and shaft 20 will be free to rotate in the same direction but at a higher rate of rotation than the flange 26, inasmuch as rotation of the driven member at a higher rate will cause the rollers to be moved into the deeper ends of the raceways, out of driving contact with the overrunning clutch members. Sleeve 21 is adapted to be shifted to the left, looking at Fig. 2, to mesh teeth 22 thereof with teeth 23 of the gear 12 for locking the intermediate shaft 20 for rotation with gear 12. Further movement of sleeve 21 to the left will couple teeth 24 and 25 which will effect a two-way driving connection between gears 12 and 15, as a result of which the driven shaft 16 will be driven in unison with the driving shaft 11, as in high gear, or direct drive relation.

Gear 13 is provided with a portion 31 which provides a driving member of a second overrunning clutch 32 of the type illustrated in Fig. 4 of the drawings and is provided with a set of internal teeth 33 cooperable with an externally toothed clutch element 34 slidably splined to the countershaft 18 for affording a positive locked-up overdrive connection between the driving and the driven shafts and through the intermediary of gears 12, 13, clutch element 33, countershaft 18 and gears 17 and 15. The annular driven element 35 of the overrunning clutch 32 surrounds the portion or driving member 31 and is provided with a plurality of bolt-engaging recesses 36 which are adapted to receive movable bolts 37 carried by a driven or core clutch member 38. This core is rotatable within the annular driven member 35. The clutch members 35, 38 and the bolts 37 provide a centrifugally actuated clutch of the type illustrated in Fig. 3 of the drawings, which is operable responsive to centrifugal force and as here shown is adapted to effect a driving connection between gear 13 and countershaft 18. The centrifugally actuated clutch as shown in Fig. 3 has each of its bolts 37 mounted in a groove 39 in the core 38 and normally retained therein by means of a spring 40 disposed in a bore 41 in the body of the bolt. One end of the spring is engaged with a pin 42 fixed to the core and extending through a relatively large opening 43 in the bolt. The other end of this spring engages an adjustable plug 44 threadedly mounted in the bore 41 whereby the tension of the spring may be varied. The core 38 is provided with a spring-pressed poppet 45, backed by an adjustable plug 46 and bearing against one side of the bolt 37 so that it may engage in a notch 47 of the bolt when the latter is in projected position, for delaying the inward movement of the bolt under influence of the spring 40. The bolt is movable outwardly responsive to centrifugal force resulting from rotation of the core 38 at a rate which may be selected by adjustment of the plug 44 to vary the tension of the spring 40, and by a second spring urged poppet 48. This second poppet is carried by the core 38 for engaging in a notch 49 for delaying the outward movement of the bolt. Inasmuch as the poppets delay the movement of the bolt from one of its positions to the other under influence of centrifugal force or of the spring 40, there will be a difference between the rotative speeds of the core 38 at which the bolt moves from one of its positions to the other. The spring-pressed poppets will insure a quick positive movement of the bolts from one position to the other and prevent a hang-up of the bolts in an intermediate position.

Each bolt 37 is provided with a tapered or inclined outer end 50 which will cause the bolt to jump the recesses 36 until the rotative speeds of the clutch members 35 and 38 are approximately synchronous, at which time the bolts will be centrifugally extended to lock said members together. Deceleration of the rotative speed of the core 38 below that necessary to hold the bolts extended, will permit the spring 40 to move the bolts to their inner positions.

Figure 2:
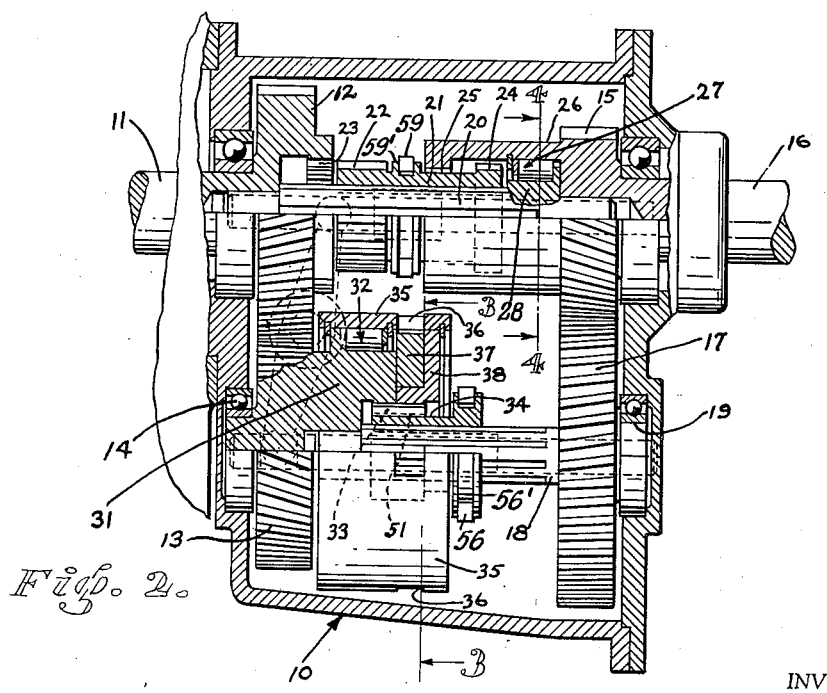
Fig. 2 is a longitudinal view, partly in section of automatic transmission mechanism embodying my invention.

As shown in Fig. 2 of the drawings, the toothed clutch element 34 is in engagement with the teeth 33 or in other words, gear 13, but the clutch member 34 may be relieved from engagement with said teeth by shifting the same to the right, as a result of which only the teeth 51 of the core clutch member 38 will be meshed with toothed clutch element 34.

A lever 52 suitably secured at 53 to the case of the overdrive transmission is provided with an arm 54 engageable with a shifter rod 55 carrying a fork 56 which is engaged with a collar 56' on member 34 and is operable for shifting clutch member 34 upon the countershaft 18. The lever 52 is provided with a second arm 57 engageable with a shifter rod 58 carrying a yoke 59 which is engageable with a groove 59' on sleeve 21 for shifting the same upon the intermediate shaft 20. It will be observed that movement of the lever 52 upon its pivot 53 is adapted to move clutch member 34 in a direction opposite to that in which clutch sleeve 21 is moved so that when sleeve 21 is shifted to the left to couple teeth 22 and 23, the clutch element 34 will be shifted to the right so as to be relieved from engagement with teeth 33 provided on the gear 13, while further movement of sleeve 21 to the left to couple teeth 24 and teeth 25 will uncouple the slidable clutch element 34 from engagement with teeth 51 provided on the core clutch member 38.

Assuming that sleeve 21 has been shifted to the left, looking at Fig. 2, to couple teeth 22 and 23, a one-way direct driving connection will be afforded between the driving and the driven shafts through clutch 27, as a result of which clutch element 35 of the centrifugal clutch now driven by gear 13 will be rotating at a definite rate of speed, while the core clutch element 38 of the centrifugally actuated clutch will be rotating at a lower rate of speed since the same at such time will be driven from the driven shaft through gears 15 and 17, as a result of which a relative rotation between the elements of the centrifugal clutch will exist. Subsequent to the attainment of a predetermined speed of rotation by the core clutch element 38 which will be sufficient to move the bolt 37 outwardly to engage in the bolt-engaging recesses 36, if the speed of rotation of the clutch element 35 is decelerated to that of the core clutch element 38 such as by temporary closing of the throttle governing the speed of the engine, the bolts 37 will be moved into the bolt-engaging recesses 36, as a result of which gear 13 will be connected to drive countershaft 18, whereby the driven shaft 16 will be driven through gears 15, 17, the centrifugally actuated clutch and gears 13 and 12 at a higher rate of rotation than that afforded by the direct one-way driving connection, since the gears 13 and 17 on the countershaft will provide a stepped-up or overdrive connection between the driving and the driven shafts.

It will now be apparent that I provided a novel automatic transmission in which the automatic overdrive gearing is associated with the countershaft and gearing thereon in a particularly novel manner affording selective and automatic change speed operations as desired with a comparatively simple, compact and reliable mechanism.

I claim:

1. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, and means including gearing connecting said driving and driven shafts around said sleeve and an automatically operable clutch for driving the driven shaft at a speed in excess of that provided by said direct driving connection.

2. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, a countergear offset from the axis of and continuously driven from said driving shaft, a second countergear alined with said first countergear and drivingly connected with said driven shaft, and an automatic clutch interposed between said first and second countergears cooperating with said gears for overdriving said driven shaft when said sleeve is disconnected from the driving and driven shafts.

3. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, a counter gear offset from the axis of and continuously driven from said driving shaft, a second countergear alined with said first countergear and drivingly connected with said driven shaft, and an automatic clutch interposed between said first and second countergears cooperating with said gears for overdriving said driven shaft when said sleeve is disconnected from the driving and driven shafts, said automatic clutch including relatively rotatable members adapted for connection when said members are synchronously rotated, and shiftable means for operatively connecting one member of said automatic clutch with one of said countergears.

4. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, a pair of alined gears drivingly connected with said driving and driven shafts, respectively, an overrunning clutch having one member thereof continuously driven by the driving shaft, an automatic clutch having one of its members drivingly connected with the other member of said last mentioned overrunning clutch, the other member of said automatic clutch adapted to be drivingly connected with the driven shaft, and shiftable means for selectively connecting and disconnecting the first member of the last-mentioned overrunning clutch relative to the second member of the automatic clutch.

5. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, a pair of alined gears drivingly connected with said driving and driven shafts, respectively, an overrunning clutch having one member thereof continuously driven by the driving shaft, an automatic clutch having one of its members drivingly connected with the other member of said last mentioned overrunning clutch, the other member of said automatic clutch adapted to be drivingly connected with the driven shaft, and shiftable means for selectively connecting and disconnecting the first member of the last mentioned overrunning clutch relative to the second member of the automatic clutch, and common means for simultaneously shifting said sleeve and said shiftable member in the selection of a desired speed for said driven shaft.

6. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, and an overdrive mechanism including a pair of alined gears drivingly connected with said driving and driven shafts, respectively, an overrunning clutch having a driving member driven through one of said gears, an automatic clutch having a driven member adapted to be drivingly connected with said other gear, a driven member for said second overrunning clutch and a driving member for said automatic clutch drivingly connected together, and shiftable means for selectively rendering said overrunning clutches and said automatic clutch operative so as to provide a one-way drive and two-way direct drive and an overdrive for the driven shaft.

7. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, and an overdrive mechanism including a pair of alined gears drivingly connected with said driving and driven shafts, respectively, an overrunning clutch having a driving member driven through one of said gears, an automatic clutch having a driven member adapted to be drivingly connected with said other gear, a driven member for said second overrunning clutch and a driving member for said automatic clutch drivingly connected together, and shiftable means for selectively rendering said overrunning clutches and said automatic clutch operative so as to provide a one-way drive and two-way direct drive and an overdrive for the driven shaft, the drive member of said second overrunning clutch and the driven member of said automatic clutch having corresponding clutch portions and said shiftable means having a clutch member adapted to selectively engage said clutch portions for drivingly connecting the same when said sleeve is shifted in a given direction.

8. A transmission comprising: a driving shaft and a driven shaft, an intermediate shaft alined with the driving and driven shafts, an overrunning clutch arranged for operatively connecting said intermediate shaft with said driven shaft to provide a one-way driving connection, a sleeve slidable on said intermediate shaft having spaced clutch portions thereon, and clutch members connected with said driving shaft and one member of said overrunning clutch whereby when said sleeve is shifted in a given direction a two-way direct driving connection may be established between said driving and driven shafts, and an overdrive mechanism including a pair of alined gears drivingly connected with said driving and driven shafts, respectively, an overrunning clutch having a driving member driven through one of said gears, an automatic clutch having a driven member adapted to be drivingly connected with said other gear, a driven member for said second overrunning clutch and a driving member for said automatic clutch drivingly connected together, and shiftable means for selectively rendering said overrunning clutches and said automatic clutch operative so as to provide a one-way drive and two-way direct drive and an overdrive for the driven shaft, the drive member of said second overrunning clutch and the driven member of said automatic clutch having corresponding clutch portions and said shiftable means having a clutch member adapted to selectively engage said clutch portions for drivingly connecting the same when said sleeve is shifted in a given direction, and means connecting and for reversely shifting said sleeve and said shiftable member in the selection of a speed for the driven shaft.

9. An overdrive transmission comprising: a driving shaft and a driven shaft, a longitudinally shiftable member therebetween, a gear on said driving shaft and a gear on said driven shaft each having clutch portions on adjacent sides, clutch portions on said shiftable member adapted for selective engagement with the clutch portions on said gears, an overrunning clutch operative between the shiftable member and the driven shaft, said clutches adapted to provide a positive direct and a one-way drive, selectively, between said shafts; a pair of alined counter gears drivingly connected, respectively, with the gears on said shafts, a second overrunning clutch driven from said drive shaft gear, an automatic clutch having one member thereof drivingly connected with a member of said second overrunning clutch and its other member adapted to be drivingly connected with said driven shaft gear, and shiftable means for controlling the operation of the driven shaft through said second overrunning clutch and said automatic clutch.

10. An overdrive transmission comprising: a driving shaft and a driven shaft, a longitudinally shiftable member therebetween, a gear on said driving shaft and a gear on said driven shaft each having clutch portions on adjacent sides, clutch portions on said shiftable member adapted for selective engagement with the clutch portions on said gears, an overrunning clutch operative between the shiftable member and the driven shaft, said clutches adapted to provide a positive direct and a one-way drive, selectively, between said shafts; a pair of alined counter gears drivingly connected, respectively, with the gears on said shafts, a second overrunning clutch driven from said drive shaft gear, an automatic clutch having one member thereof drivingly connected with a member of said second overrunning clutch and its other member adapted to be drivingly connected with said driven shaft gear, and shiftable means for controlling the operation of the driven shaft through said second overrunning clutch and said automatic clutch, and means operatively connecting said shiftable member and said shiftable means for simultaneous operation.

REX E. KELLER.